UNITED STATES PATENT OFFICE.

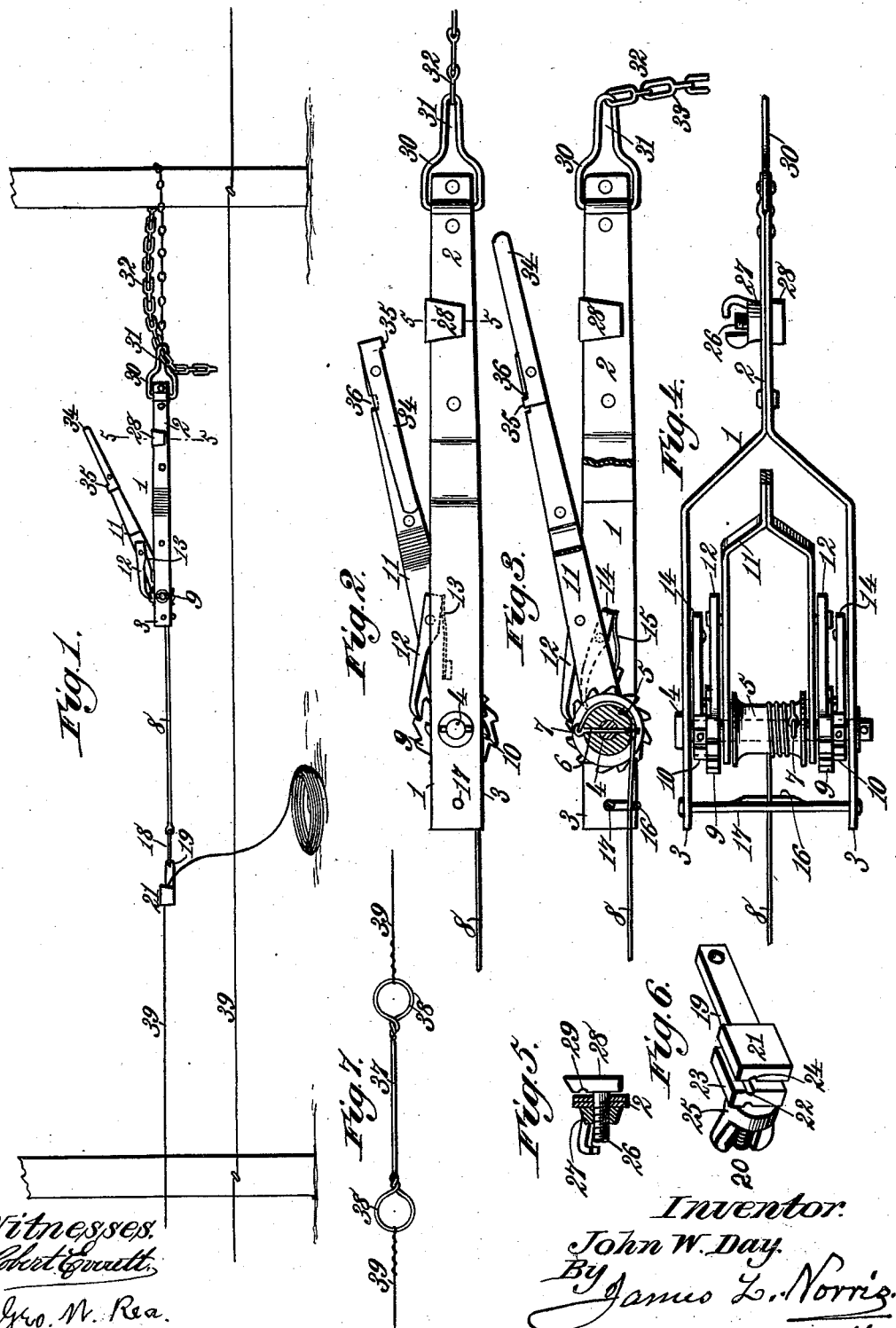

JOHN W. DAY, OF BAIRD, TEXAS.

FENCE-WIRE STRETCHER.

SPECIFICATION forming part of Letters Patent No. 547,716, dated October 8, 1895.

Application filed June 14, 1895. Serial No. 552,817. (No model.)

*To all whom it may concern:*

Be it known that I, JOHN W. DAY, a citizen of the United States, residing at Baird, in the county of Callahan and State of Texas, have invented new and useful Improvements in Fence-Wire Stretchers, of which the following is a specification.

This invention has for its object to provide an efficient, compact, and durable fence-wire stretcher that shall be simple and reliable in operation and adapted for ready attachment to any size of fence-post.

My improved wire-stretching implement comprises easily and quickly applied means for clamping and drawing together the ends of a broken fence-wire.

The invention consists in features of construction and novel combination of devices in wire stretching and mending appliances for erection and repair of wire fences, as hereinafter more particularly described and claimed.

In the annexed drawings, illustrating the invention, Figure 1 is a view showing the application of my improved appliances for the stretching of a fence-wire. Fig. 2 is a side elevation of my improved wire-stretcher. Fig. 3 is a longitudinal section of the same. Fig. 4 is a plan view of the wire-stretching implement. Fig. 5 is a transverse section on the line 5 5 of Figs. 1 and 2. Fig. 6 is a detail view of the clamping device that is secured to one end of the rope or cable operated by the drum or spool of the implement. Fig. 7 is a view of a splicing device.

The reference-numeral 1 designates the frame of the implement, comprising a shank portion 2 and branching arms 3, all of which may be formed from a suitably doubled metal strip securely riveted through the shank. Between the arms 3 and near their ends is journaled an axle 4, having a drum or spool 5 rigidly mounted on its central portion. The drum or spool 5 is preferably secured to the axle 4 by means of a bolt 6, having a hook 7 on one end and rigidly fastened by nuts or otherwise. The hook 7 of the bolt 6 serves as a point of attachment for a rope or cable 8, that is to be utilized in the stretching of a fence-wire, as hereinafter explained. On the axle 4 at each side of the drum or spool 5 is rigidly secured a ratchet-wheel 9, having a ratchet-pinion 10 on its outer side. A bifurcated lever 11 is loosely mounted on the axle 4 between the spool or drum 5 and ratchet-wheels 9, and on each arm or fork of this lever is mounted a driving-pawl 12 to engage one of the ratchet-wheels, and a spring 13 for holding said pawl to its work. Each side arm 3 of the frame 1 has mounted thereon a backlash-pawl 14 for engagement with one of the ratchet-pinions to prevent a retrograde rotation of the drum or spool 5, and a spring 15 is provided for each of the pawls. It is obvious that by oscillating the bifurcated lever 11 on the fulcrum provided by the axle 4 the driving-pawls 12 will act on the ratchet-wheels 9 in such manner as to cause a rotation of the axle and the spool or drum 5, that is rigid thereon. At the same time the ratchet-pinions 10 and stop-pawls 14 will prevent backward rotation of the drum. The rope or cable 8, attached to the spool 5, is extended through a guide loop or eye 16 on the center of a bar 17, that is supported by the ends of the frame-arms 3 and preferably pivoted therein.

To the outer end of the rope or cable 8 is attached, preferably by means of a link 18, a clamping-bar 19, having an aperture for passage of a screw-bolt 20, on one end of which a large head 21 is provided. The clamping-bar 19 is provided on both sides adjacent to the bolt-aperture with grooves 22 for receiving a fence-wire that may be passed once or twice around the lateral lug or projection 23, in which said grooves are preferably formed. There is also formed in the under side of the bolt-head 21 a groove 24 to receive this fence-wire. A thumb-nut 25 on the bolt 20 will serve to securely clamp the wire engaged in the grooves of the bolt-head and clamping-bar. When the wire has thus been securely clamped, a rotation of the drum or spool 5 to wind the rope or cable 8 thereon will permit the ready application of such force as may be required to properly stretch the wire. Through the shank 2 of the implement is passed a screw-bolt 26, having on one end a thumb-nut 27, and provided on its other end with an enlarged head 28, that may have in its under side a groove 29 or be otherwise formed to receive and clamp one end or portion of a fence-wire. By means of this clamping device the wire-stretching implement may be secured to one end or portion of a broken fence-wire when the same is distant from a fence-post, and the previously-described clamping-bar 19 being then connected with the other portion of broken wire the implement may be operated through its lever 11 to bring the two ends or portions of wire sufficiently close together to permit a proper connection of one portion of the wire to another portion.

For the purpose of providing a means of attachment to a fence-post there is pivoted in the end of the shank 2 a ring 30, having a slotted or elongated opening 31 in one side. To this ring 30 is secured one end of a chain 32, that is to be passed around a fence-post and then have its other end secured in the slotted or narrow elongated portion of the ring. The links of the chain 32 are preferably so constructed as to present enlargements 33, that will readily pass through the main portion of the ring 30, but which may be engaged with the slotted portion of the ring and at any desired point on the chain, so as to firmly secure the implement to a post around which the chain 32 may have been tightly drawn. The lever 11 may be provided with a folding handle extension 34, pivoted to the main portion of said lever. On this lever extension 34 may be formed or provided a catch-lug 35 to engage a notch 36 in the main portion of the lever and thereby brace the lever-handle when unfolded or extended. The provision of the pivoted lever extension 34 enables the lever to be folded into a small compass when the implement is not in use and yet furnishes, by unfolding of the extension 34, an adequate and easy leverage for rapid and efficient operation of the implement. By pivotally mounting the ring 30 it can be folded against the side of the shank 2 and thus somewhat shorten the implement when not in use.

The manner of applying and operating this fence-wire stretcher will be apparent. If a fence-post is conveniently situated for furnishing a support, the chain 32 may be drawn tightly around the post and then secured by slipping a portion of it into the elongated opening or slot 31 of the ring 30, where the binding action of any one of the link projections 33 will hold the chain firmly. Should there be a break in a fence-wire at a distance from a post, one end of the broken wire may be clamped between the shank 2 and head 28 of the clamping-bolt 26, that is supported by said shank. In whichever way the frame 1 is supported, whether by attachment to a fence-post or to one end of a broken wire, the rope or cable 8 will be partly or wholly unwound from the spool or drum 5 and be connected by the clamping device 19 to the portion of fence-wire that is to be directly stretched or extended. By now oscillating the lever 11 the rope or cable 8 will be wound onto the drum or spool 5, and the fence-wire will consequently be extended or stretched, as required, and be quickly brought to any desired tension. The fence-wire may be stapled or otherwise secured to fence-posts in any appropriate and well-known manner. If the wire-stretching implement is being employed in the repair of fences and the broken wires are too short to be brought directly together, a splice-piece 37 may be used to form an intermediate connection for the wire end. This splice-piece 37 consists of a suitable length of stout wire having a ring 38 formed at each end, through which the ends of the fence-wire 39 may be passed and secured by twisting.

This wire-stretching implement is compact and need not exceed fifteen inches in length by four inches in width. It comprises but few parts, is not liable to become broken or disarranged, and can be quickly applied and rapidly operated.

What I claim as my invention is—

1. In a wire stretcher, the combination of a frame, a drum or spool mounted in said frame, a cable or rope having one end secured to the drum or spool and its other end provided with a wire clamping device, ratchet mechanism for said drum, and a ratchet actuating lever provided with a pivoted or folding extension and a catch for bracing the same, substantially as described.

2. In a wire stretcher, the combination of a frame, a rotary drum or spool mounted in said frame, a rope or cable connected to said drum or spool, a wire clamping device attached to said rope or cable, a loop pivotally supported in one end of the drum supporting frame and provided with an elongated, contracted portion having a slot adapted to prevent the passage therethrough of a link arranged cross-wise of said contracted portion, and a chain attached to said loop and adapted to be passed around a fence post and be secured in the slotted portion of said ring, substantially as described.

In testimony whereof I have hereunto set my hand in presence of two subscribing witnesses.

JOHN W. DAY.

Witnesses:
I. N. JACKSON,
W. E. GILLILAND.